United States Patent
Lickfelt

(10) Patent No.: US 8,446,128 B2
(45) Date of Patent: May 21, 2013

(54) VEHICLE BATTERY MANAGEMENT SYSTEM AND METHOD

(75) Inventor: Brian K. Lickfelt, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 571 days.

(21) Appl. No.: 12/610,677

(22) Filed: Nov. 2, 2009

(65) Prior Publication Data

US 2011/0106330 A1    May 5, 2011

(51) Int. Cl.
 *H02J 7/00* (2006.01)
 *H02J 7/18* (2006.01)
(52) U.S. Cl.
 USPC ......................................... 320/136; 307/10.7
(58) Field of Classification Search .................. 320/135, 320/136; 307/10.7
 See application file for complete search history.

(56) References Cited

U.S. PATENT DOCUMENTS

| | | | |
|---|---|---|---|
| 3,656,045 A | 4/1972 | Frezzolini et al. | |
| 4,902,956 A | 2/1990 | Sloan | |
| 5,296,997 A * | 3/1994 | Betton et al. | 361/92 |
| 6,037,749 A | 3/2000 | Parsonage | |
| 6,630,749 B1 | 10/2003 | Takagi et al. | |
| 6,759,760 B2 * | 7/2004 | Gaynier et al. | 307/10.7 |
| 6,806,588 B2 | 10/2004 | Amano et al. | |
| 7,248,152 B2 | 7/2007 | Gilbert et al. | |
| 2009/0184578 A1 | 7/2009 | Owens | |

* cited by examiner

*Primary Examiner* — Richard V Muralidar
(74) *Attorney, Agent, or Firm* — Rankin, Hill & Clark LLP

(57) ABSTRACT

A vehicle battery management system and method includes a battery, a battery sensor for measuring a condition of the battery and an electronic control unit that receives a signal from the battery sensor corresponding to the condition of the battery. The electronic control unit selectively connects and disconnects that the battery from each of: at least one accessory load and at least one other load. The at least one other load is disconnected from the battery when the vehicle is in a shipping mode and the at least one accessory load is connected to the battery when the vehicle is in an accessory ON mode. The electronic control unit disconnects the at least one accessory load from the battery when the vehicle is in the accessory ON mode and in the shipping mode when the signal indicates that the condition of the battery is below a predetermined threshold.

20 Claims, 2 Drawing Sheets

VEHICLE BATTERY MANAGEMENT SYSTEM AND METHOD

BACKGROUND

Exemplary embodiments herein broadly relate to vehicle battery management systems and methods.

Traditionally, vehicles employed a standard mechanical key ignition switch; however, more recently some cars include a "push button start" feature that allows a customer to start the car without handling a key or key fob (e.g., removing from a pocket, purse, etc.). Some vehicles also include a battery management system that monitors power to the vehicle. The battery management system can warn the driver to turn off power when detected that the battery reaches a critical state (e.g., a level of charge below a predetermined level). Some battery management systems even go as far as cutting the battery out completely when the battery reaches a critical state if the vehicle is not powered off by the user.

Separately, some vehicle manufacturers provide a "shipping mode" for their vehicles. This mode allows the vehicle to remain in a very low power state, which advantageously maximizes battery life, such as during shipping. One known shipping mode involves disconnecting selected circuits or loads from the battery by manually removing or physically disconnecting a corresponding fuse typically arranged between the battery and the circuits or loads that are to be isolated. The fuse, when installed, can supply power to many ECUs of the vehicle allowing them to access some level of low power operation for fast wake-up, memory retention, etc. When removed, these ECUs are OFF, pulling no power.

When vehicles with "push button start" features are shipped, it is somewhat easy for the transport personnel to accidentally leave the vehicle in an "accessory on" state. This can lead to dead batteries (or at least premature dead batteries) especially considering that shipping of the vehicle can take place over several days. This, of course, can result in customer dissatisfaction.

SUMMARY

According to one aspect, a battery management system for a vehicle includes a battery, a battery sensor for measuring a condition of said battery, and an electronic control unit receiving a signal from the battery sensor corresponding to the condition of said battery. The electronic control unit is configured to selectively connect and disconnect the battery to and from each of at least one accessory load and at least one other load. The electronic control unit connects the at least one accessory load to the battery when the vehicle is in an accessory ON mode and disconnects the at least one other load from the battery when the vehicle is in a shipping mode. The electronic control unit also disconnects the at least one accessory load from the battery when the vehicle is in the accessory ON mode and in the shipping mode when the signal from the battery sensor indicates that the condition of the battery is below a predetermined threshold.

According to another aspect, a vehicle battery management system for a vehicle includes a battery and a battery sensor for measuring a condition of the battery. At least one accessory load is selectively connected to the battery for powering thereof. The at least one accessory load is connected to the battery when the vehicle is in an accessory ON mode. At least one other load is selectively connected to the battery for powering thereof. The at least one other load is disconnected from the battery when the vehicle is in a shipping mode. An electronic control unit receives a signal from the battery sensor corresponding to the condition of the battery. The electronic control unit is configured to disconnect the at least one accessory load from the battery based on the accessory ON mode, the shipping mode and the condition of said battery.

According to still another aspect, a vehicle battery management method is provided. In the method according to this aspect, at least one accessory load is connected to a vehicle battery when an accessory mode is ON. At least one other load is disconnected from the vehicle battery when a shipping mode is ON. A condition of the battery is monitored and, after connecting the at least one accessory load, the at least once accessory load is disconnected from the vehicle battery while both the accessory and shipping modes are ON when the condition of the battery is below a predetermined threshold.

According to still yet another aspect, a battery management method is provided for a battery in a vehicle. In the method according to this aspect, determinations are made as to whether the vehicle is in shipping mode, whether accessory power is ON in the vehicle, and whether the battery in the vehicle is low. Accessory power is turned OFF in the vehicle when determined that the vehicle is in shipping mode, accessory power is ON and that the battery is low.

DETAILED DESCRIPTION

Figure 1:
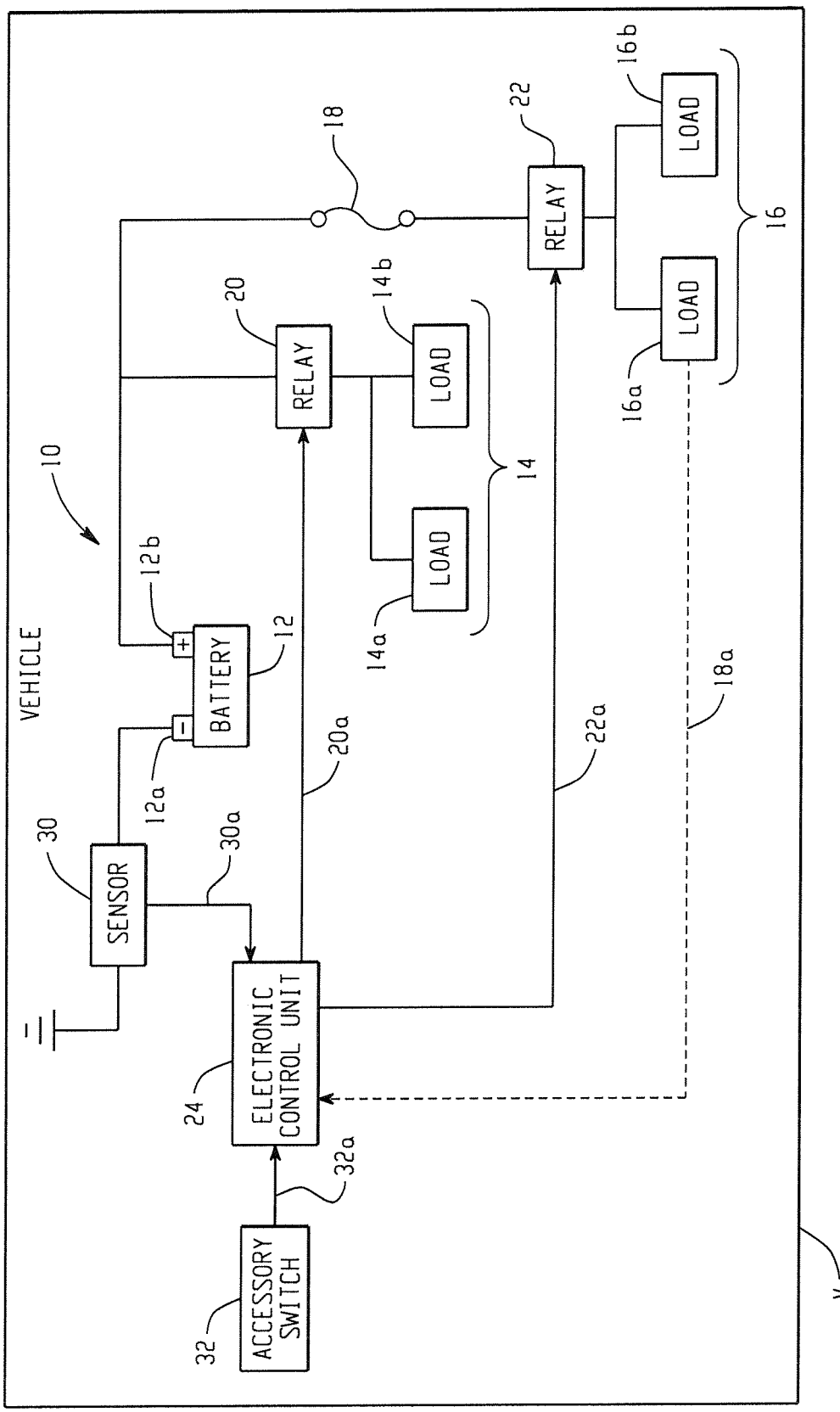
FIG. 1 is a schematic diagram showing an exemplary electrical system of a vehicle suitable for practicing aspects of the present disclosed subject matter.

Referring now to the drawings, wherein the showings are for purposes of illustrating one or more exemplary embodiments, FIG. 1 shows a battery management system 10 for a vehicle that manages power delivered from a storage battery 12 in an electrical system of vehicle V. The system 10 includes at least one accessory load 14 (e.g., load 14a and load 14b) selectively connected to the battery 12 for powering thereof. The system 10 also includes at least one other load 16 (e.g., load 16a and load 16b) selectively connected to the battery 12 for powering thereof. While the illustrated embodiment shows only two loads 14a, 14b as the accessory loads, it is to be appreciated that any number of loads could be provided as the accessory loads and these loads could each be any electrical device or system in the vehicle V. Similarly, while only two loads 16a, 16b are shown as the other loads, it is to be appreciated that any number of loads could be provided in the vehicle V as the other loads and that these loads could be any device and/or system in the vehicle V.

By way of example, the accessory loads 14 could be one or more of sound or entertainment system, interior lighting, HVAC blower, electrically powered adjustable components such as seats, mirrors, windows, among others, navigational system, etc. The other loads 16 could be, for example, various electronic control units of the vehicle V having programmable memory items. The battery 12 can be a nominal 12 volt battery of the type commonly employed in automobiles or may be any other type of battery, e.g., typically used in automotive applications.

Also shown in FIG. 1 is a fuse 18 or other similar device through which electric power and/or current is delivered to the other loads 16 from the battery 12. Suitably, the fuse 18 can protect the other loads 14 from receiving excessive electrical power or current. As shown in FIG. 1, devices such as relays 20, 22 or other suitable switches or the like are respectively arranged between the battery 12 and the accessory loads 14 and the other loads 16. The relay 22 is further arranged, in the illustrated embodiment, in series with the fuse 18.

Under the control of an electronic control unit (ECU) 24, the relays 20, 22 can be selectively opened and closed. Accordingly, the ECU 24 is configured to selectively connect and disconnect the battery 12 to and from each of the accessory loads 14 and the other loads 16. In its open state, the relay 20 disconnects or otherwise isolates the accessory loads 14 from the battery 12 so that current or electric power is not drawn by the accessory loads 14 from the battery 12. Likewise, the relay 22 disconnects or otherwise isolates the other loads 16 from the battery 12 so that current or electrical power is not drawn by the other loads 16 from the battery 12. Accordingly, when the electronic control unit 24 detects a selective condition or otherwise determines that certain criteria are met, ECU 24 sends suitable control signals 20a, 22a selectively and independently to the relays 20 and 22. In response to the control signals 20a, 22a, the relays 20, 22 can be tripped or otherwise set to respective open states thereby cutting-off the delivery of electrical power or current from the battery 12 to one or both of the accessory loads 14 and the other loads 16. Alternately, in their respective closed states, the relays 20, 22 can operatively connect the accessory loads 14 and other loads 16 to the battery 12 so that electrical power and/or current can be delivered from the battery 12 to one or both of the accessory loads 14 and the other loads 16.

Suitably, the ECU 24 regulates or otherwise controls operation of the relays 20 and 22 in response to one or more triggering conditions having been detected and/or selected criteria having been met. For example, in the illustrated embodiment, the ECU 24 is configured to connect the accessory loads 14 to the battery 12 when the vehicle V is in an accessory ON mode. Accordingly, the ECU can connect the accessory loads 14 to the battery 12 when the vehicle V is in the accessory ON mode by commanding the relay 20 via signal 20a to close or remain closed. The ECU 24 can also be configured to disconnect the other loads 16 from the battery 12 when the vehicle V is in a shipping mode. Accordingly, the ECU 24 can disconnect the other loads 16 from the battery 12 when the vehicle V is in a shipping mode. This can be, for example, due to removal of the fuse 18. Alternatively, the shipping mode can be achieved by controlling the relay 22.

The battery management system 10 further includes a battery sensory 30 for measuring a condition of the battery 12. In the illustrated embodiment, the sensor 30 is connected to a negative terminal 12a of the battery 12, though this is not required and other arrangements are contemplated (e.g., connected to only the positive terminal 12b, connected to both terminals 12a, 12b, etc.). The ECU 24 can receive a signal 30a from the battery sensor 30 corresponding to the condition of the battery. As will be described in more detail below, the ECU 24 can be further configured to disconnect the accessory loads 14 from the battery 12 based on the accessory ON mode (e.g., when it is ON), the shipping mode (e.g., when it is active) and the condition of the battery 12. In particular, the ECU 24 can disconnect the accessory loads 14 from the battery 12 when the vehicle V is in the accessory ON mode and in the shipping mode (e.g., the fuse 18 is removed and/or the relay 22 is open) when the signal 30a indicates that the condition of the battery 12 is below a predetermined threshold.

In one exemplary embodiment, the sensor 30 is a state of charge (SOC) sensor that senses, detects and/or otherwise determines a SOC or condition of the battery 12. In the illustrated embodiment, the sensor 30 is electrically connected to the battery 12 for determining the SOC and/or condition of the battery 12 and generating the signal 30a representative thereof to send to the ECU 24. The signal 30a can be one or more signals that indicate the condition or SOC of the battery 12. The condition can be a value indicating the charge remaining in the battery 12 relative to a scale ranging between a low end where no charge remains in the battery 12 and a high end where the battery 12 is fully charged. In one suitable embodiment, the SOC signal 30 indicates the condition of the battery 12 as related to its overall charge capacity (i.e., a value or percentage of a maximum SOC of the battery 12). In another exemplary embodiment, the SOC signal indicates the percentage of maximum electrical energy output of the battery 12. In either example, the sensor 30 measures or otherwise detects any one or more of a variety of different factors and/or parameters from which battery's SOC is calculated or otherwise determined. These factors or parameters can suitably include, but are not limited to, the battery voltage, battery current, charge balance, etc. In practice, any of a variety of well known or otherwise appropriate methods and/or algorithms may optionally be used to calculate or determine the SOC from the respective parameters measure or otherwise obtained by the sensor 30.

The system 10 can further include an accessory mode control switch 32 connected to the ECU 24. In one exemplary embodiment, the accessory mode control switch 30 is moveable from an accessory mode ON position wherein the ECU 24 is in the accessory ON mode and an accessory OFF position wherein the ECU is not in the accessory ON mode. The position of the switch 32 can be relayed to the ECU 24 via signal 32a. The ECU 24 can then control or otherwise operate the relay 20 through signal 20a based on the position of the accessory mode control switch 30. Accordingly, when the switch 30 is in the accessory mode ON position (and thus the vehicle V is in the accessory ON mode), the ECU 24 can operate the relay 20 to electrically connect the accessory loads 14 to the battery 12).

In one alternate embodiment, the ECU 24 can be configured to disconnect the accessory loads 14 from the battery 12 based on the accessory ON mode and the shipping mode without regard to the condition of the battery 12. Instead, a timer could be used (e.g., one integral with the ECU 24) whenever the vehicle V enters shipping mode and the accessory mode is ON. If the accessory mode remains ON for more than a predetermined period of time (e.g., five minutes) as determined by the timer, the accessory loads 14 can be disconnected from the battery 12 via the relay 20.

Figure 2:
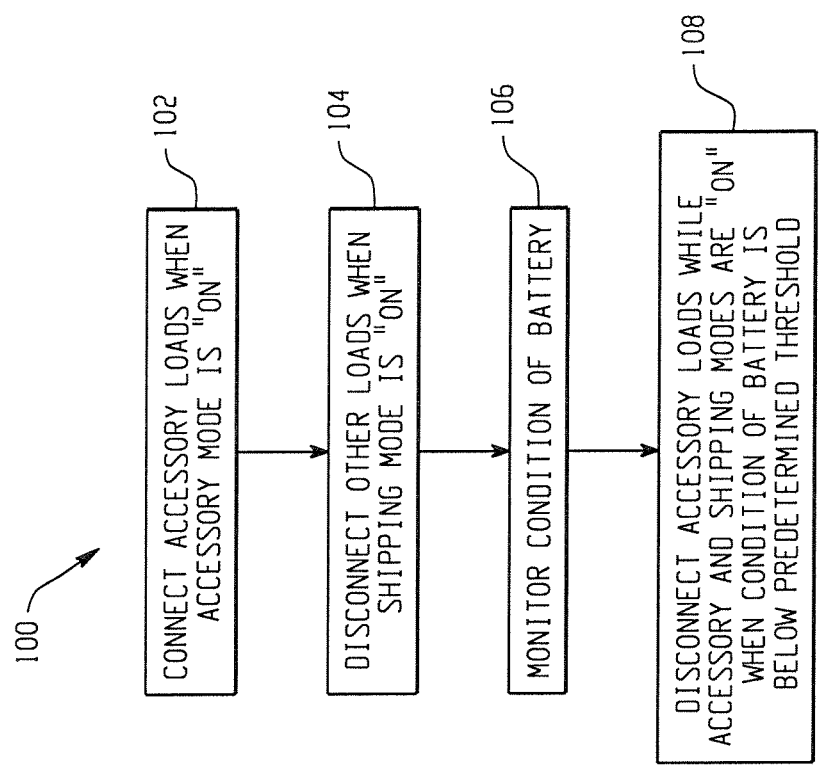
FIG. 2 is a flow chart showing an exemplary process for automatically isolating at least one accessory load from a vehicle battery in accordance with aspects of the present disclosed subject matter.

With reference to FIG. 2, method 100 is illustrated for vehicle battery management. In the method, at least one accessory load 14 is connected to the vehicle battery 12 when the accessory mode is ON in 102. As already mentioned, the accessory mode can be turned on by the accessory mode control switch 32 being moved from its OFF position to its ON position. In an exemplary embodiment, the accessory mode control switch 32 is disposed in a passenger compartment of the vehicle V for manipulation by a vehicle operator. For example, the accessory mode control switch 34 can be disposed on the steering column of the vehicle V (not shown).

In 104, the at least one other load 16 is disconnected from the vehicle battery 12 when a shipping mode is ON. As already mentioned, the shipping mode can be turned ON by removing the shipping fuse 18 that is interposed between the battery 12 and the other loads 16. Alternatively, the shipping mode can be turned on by the ECU 24 through the relay 22 or through some other operation. In this alternate case, the ECU 24 is aware that shipping mode is ON because the ECU 24 controls when shipping mode is turned ON and OFF by opening and closing the relay 22. For example, shipping mode being ON can be a software condition of the ECU 24. When shipping mode is turned on by removal of the fuse 18, the ECU 24 can be made aware of the shipping mode being turned ON by one of the loads 16a or 16b that is electrically isolated by the shipping fuse 18. For example, the load 16a can be an electronic control unit for controlling a subsystem of the vehicle V. Primary power can be delivered to the load 16a through the fuse 18 and another line (not shown) can deliver auxiliary power to the load 16a. When the load 16a only receives power through the auxiliary line, it can inform the ECU 24 that the vehicle V is in shipping mode via signal 18a.

The condition of the vehicle battery 12 is monitored in S106. As mentioned, monitoring the condition of the battery can include monitoring a state of charge (SOC) of the battery 12, such as through sensor 30. In particular, monitoring the state of charge of the battery 12 can include having the battery sensor 30 monitor the state of charge of the battery 12 and communicate signal 30a to the ECU 24 indicative of the state of charge.

In 108, after the accessory loads 14 are connected in 102, the accessory loads 14 can be disconnected from the vehicle battery 12 while both the accessory and shipping modes are ON when the condition of the battery 12 is below a predetermined threshold. In an exemplary embodiment, disconnecting the accessory loads 14 from the vehicle battery 12 in 108 includes commanding the accessory relay 20 to disconnect the accessory loads from the vehicle battery 12. Such commanding can occur by the ECU 24 sending signal 20a to the relay 20 commanding the accessory relay 20 to open (such as by de-energizing) and thereby disconnect the accessory loads 14 from the battery 12.

Figure 3:
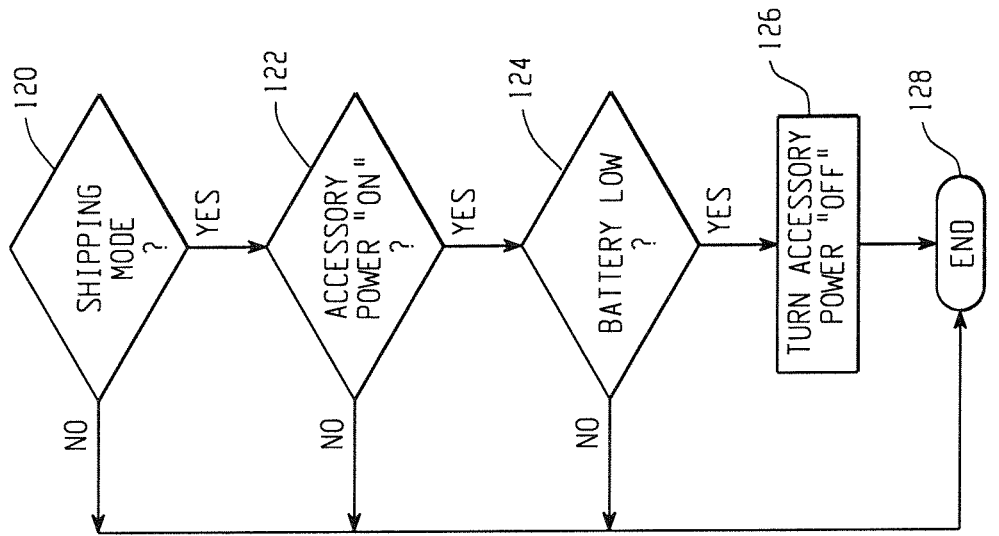
FIG. 3 is a flow chart showing an exemplary process for turning accessory power OFF in a vehicle when determined that the vehicle is in shipping mode, accessory power is ON and that the battery is low.

With reference to FIG. 3, another battery management method for a battery in a vehicle is illustrated. In the method of FIG. 3, whether the vehicle is in the shipping mode is determined in 120, whether the accessory power is on in the vehicle V is determined in 122, and whether the battery 12 in the vehicle V is low is determined in 124. Then, in 126, accessory power is turned OFF in the vehicle V when determined that the vehicle is in the shipping mode in 120, the accessory power is on in 122 and the battery is low in 124. If any of these conditions are not met (i.e., in 120, 122, and 124), the method ends at 128.

As already described, determining whether the vehicle V is in the shipping mode can include determining whether shipping fuse 18 has been removed from the vehicle V. Determining whether the accessory power is ON can include determining whether the accessory power control switch 32 is in its ON position. Determining whether the battery 12 in the vehicle V is low can include using the battery sensor 30 to monitor the state of charge of the battery 12. The determinations in 120, 122, and 124 can be made by the ECU 24. In particular, the ECU 24 can receive input signal 32a from the accessory power control switch 32 indicating that the accessory power is ON and can receive the condition signal 30a from the battery sensor 30 connected to the battery 12 indicating whether the battery 12 is low.

It is to be appreciated that in connection with the particular exemplary embodiments presented herein certain structural and/or functional features are described as being incorporated in defined elements and/or components. However, it is contemplated that these features may, to the same or similar benefit, also likewise be incorporated in common elements and/or components, or separated, where appropriate. For example, the control unit 24 could be distributed throughout the system 10. It is also to be appreciated that different aspects of the exemplary embodiments may be selectively employed as appropriate to achieve other alternative embodiments suited for desired applications, the other alternate embodiments thereby realizing the respective advantages of the aspects incorporated herein.

It is also to be appreciated that particular elements or components described herein may have their functionality suitably implemented via hardware, software, firmware, or in combination thereof. Additionally, it is to be appreciated that certain elements described herein as incorporated together may under suitable circumstances be stand-alone elements or otherwise divided. Similarly, a plurality of particular functions described as being carried out by one particularly element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A battery management system for a vehicle, comprising:
a battery;
a battery sensor for measuring a condition of said battery; and
an electronic control unit receiving a signal from said battery sensor corresponding to said condition of said battery, said electronic control unit configured to selectively and independently connect and disconnect the battery to and from each of at least one accessory load and at least one other load, wherein when the vehicle is in an accessory ON mode and in a shipping mode, said electronic control unit connects said at least one accessory load to said battery and disconnects said at least one other load from said battery, and wherein when the vehicle is in said accessory ON mode, in said shipping mode and said signal indicates that said condition of said battery is below a predetermined threshold, said electronic control unit disconnects said at least one accessory load from said battery.

2. The vehicle battery management system of claim 1 further including an accessory relay that connects and disconnects said at least one accessory load to and from said battery when commanded by said electronic control unit and an other load relay that connects and disconnects said at least one other load to and from said battery when commanded by said electronic control unit.

3. The vehicle battery management system of claim 1 wherein the vehicle is in said shipping mode when a fuse normally interposed between said battery and said at least one other load is removed.

4. The vehicle battery management system of claim 1 further including an accessory mode control switch connected to said electronic control unit, said accessory mode control switch movable to from an accessory mode ON position wherein said electronic control unit is in said accessory ON mode and an accessory mode OFF position wherein said electronic control unit is not in said accessory ON mode.

5. The vehicle battery management system of claim 1 wherein said condition is a state of charge of said battery.

6. The vehicle battery management system of claim 1 wherein said at least one other load includes other vehicle electronic control units having programmable memory items.

7. The vehicle battery management system of claim 1 wherein said electronic control unit further includes a timer, wherein when the vehicle is in the shipping mode and the accessory ON mode, said electronic control unit is configured to selectively disconnect at least one accessory load from the battery without regard to the condition of the battery when the timer determines that the vehicle is in said accessory ON mode for more than a predetermined period of time.

8. A battery management system for a vehicle, comprising:
 a battery;
 a battery sensor for measuring a condition of said battery;
 at least one accessory load selectively connected to said battery for powering thereof, said at least one accessory load connected to said battery when the vehicle is in an accessory ON mode;
 at least one other load selectively connected to said battery for powering thereof, said at least one other load disconnected from said battery when the vehicle is in a shipping mode; and
 an electronic control unit receiving a signal from said battery sensor corresponding to said condition of said battery, said electronic control unit configured to disconnect said at least one accessory load from said battery based on said accessory ON mode, said shipping mode and said condition of said battery.

9. A vehicle battery management method, comprising:
 connecting at least one accessory load to a vehicle battery when an accessory mode is ON;
 disconnecting at least one other load from said vehicle battery when a shipping mode is ON by commanding a first load relay in series with a shipping fuse and said at least one other load to disconnect said at least one other load from said battery;
 monitoring a condition of said vehicle battery; and
 after connecting said at least one accessory load, disconnecting said at least one accessory load from said vehicle battery, by commanding a second relay to disconnect said at least one accessory load from said vehicle battery, while both said accessory and shipping modes are ON and when said condition of said battery is below a predetermined threshold.

10. The vehicle battery management method of claim 9 wherein commanding said second relay to disconnect said at least one accessory load from said battery includes deenergizing said second relay.

11. The vehicle battery management method of claim 9 further including:
 removing the shipping fuse interposed between said battery and said at least one other load to turn said shipping mode ON.

12. The vehicle battery management method of claim 9 wherein said accessory mode is turned ON by an accessory mode control switch being moved from an OFF position to an ON position.

13. The vehicle battery management method of claim 12 wherein said accessory mode control switch is disposed in a passenger compartment of a vehicle for manipulation by a vehicle operator.

14. The vehicle battery management method of claim 9 wherein monitoring said condition of said vehicle battery includes monitoring a state of charge of said battery.

15. The vehicle battery management method of claim 14 wherein monitoring said state of charge includes having a battery sensor monitor said state of charge of said battery and communicate a signal to an electronic control unit indicative of said state of charge.

16. A battery management method for a battery in a vehicle, comprising
 determining whether the vehicle is in shipping mode through a first relay in series with an other load;
 determining whether accessory power is ON in the vehicle through a second relay in series with an accessory load;
 determining whether the battery in the vehicle is low; and
 turning accessory power OFF and turning the other load power OFF in the vehicle when determined that the vehicle is in shipping mode, said accessory power is ON and that the battery is low.

17. The battery management method of claim 16 wherein determining whether the vehicle is in said shipping mode further includes determining whether a shipping fuse has been removed from the vehicle.

18. The battery management method of claim 16 wherein determining whether accessory power is ON further includes determining whether an accessory power control switch is in an ON position.

19. The battery management method of claim 16 wherein determining whether the battery in the vehicle is low includes using a battery sensor to monitor a state of charge of the battery.

20. A battery management system for a vehicle, comprising:
 a battery;
 at least one other load selectively connected to said battery for powering thereof, said other load disconnected from said battery when a shipping mode is ON, wherein the shipping mode is turned ON through a load relay;
 at least one accessory load selectively connected to said battery for powering thereof, said accessory load connected to the battery when the accessory mode is ON, wherein the accessory mode is turned ON through an accessory load relay;
 a timer configured to monitor the accessory mode of the vehicle;
 an electronic control unit for receiving a signal from the timer, the electronic control unit configured to disconnect said at least one accessory load from said battery without regard to the condition of the battery when the accessory mode is ON, said shipping mode is ON and when said signal indicates that the accessory mode is ON for more than a predetermined period of time.

\* \* \* \* \*